United States Patent
Moretti

(10) Patent No.: US 9,483,310 B2
(45) Date of Patent: Nov. 1, 2016

(54) ASSOCIATING CACHE MEMORY WITH A WORK PROCESS

(71) Applicant: Bluedata Software, Inc., Mountain View, CA (US)

(72) Inventor: Michael J. Moretti, Saratoga, CA (US)

(73) Assignee: BLUEDATA SOFTWARE, INC., Mountain View, CA (US)

( * ) Notice: Subject to any disclaimer, the term of this patent is extended or adjusted under 35 U.S.C. 154(b) by 254 days.

(21) Appl. No.: 14/264,812

(22) Filed: Apr. 29, 2014

(65) Prior Publication Data

US 2015/0309942 A1    Oct. 29, 2015

(51) Int. Cl.
G06F 12/00 (2006.01)
G06F 9/50 (2006.01)
G06F 12/10 (2016.01)
G06F 17/30 (2006.01)

(52) U.S. Cl.
CPC ......... G06F 9/5016 (2013.01); G06F 12/1045 (2013.01); G06F 17/30 (2013.01); *G06F 2212/1016* (2013.01); *G06F 2212/1041* (2013.01); *G06F 2212/154* (2013.01); *G06F 2212/608* (2013.01)

(58) Field of Classification Search
CPC .................. G06F 12/1045; G06F 2212/1016; G06F 2212/608; G06F 2212/154; G06F 2212/1041
See application file for complete search history.

(56) References Cited

U.S. PATENT DOCUMENTS

| | | | |
|---|---|---|---|
| 7,676,554 B1 | 3/2010 | Malmskog et al. | |
| 2006/0064549 A1* | 3/2006 | Wintergerst | G06F 12/127 711/134 |
| 2006/0248276 A1* | 11/2006 | Kilian | G06F 12/0831 711/130 |
| 2007/0171921 A1 | 7/2007 | Wookey et al. | |
| 2007/0244987 A1 | 10/2007 | Pedersen et al. | |
| 2008/0183854 A1 | 7/2008 | Hopen et al. | |
| 2010/0153644 A1* | 6/2010 | Bauchot | G06F 9/445 711/118 |
| 2011/0096828 A1 | 4/2011 | Chen et al. | |
| 2011/0119228 A1 | 5/2011 | Menze et al. | |
| 2011/0276789 A1 | 11/2011 | Chambers et al. | |
| 2012/0054315 A1 | 3/2012 | Morrison, IV et al. | |
| 2013/0007223 A1 | 1/2013 | Luby et al. | |
| 2014/0025683 A1 | 1/2014 | Howland et al. | |
| 2014/0052864 A1 | 2/2014 | Van Der Linden et al. | |
| 2014/0359043 A1* | 12/2014 | Gao | G06F 15/167 709/212 |

* cited by examiner

*Primary Examiner* — John A Lane

(57) ABSTRACT

Systems, methods, and software described herein provide accelerated input and output of data in a work process. In one example, a method of operating a support process within a computing system for providing accelerated input and output for a work process includes monitoring for a file mapping attempt initiated by the work process. The method further includes, in response to the file mapping attempt, identifying a first region in memory already allocated to a cache service, and associating the first region in memory with the work process.

20 Claims, 8 Drawing Sheets

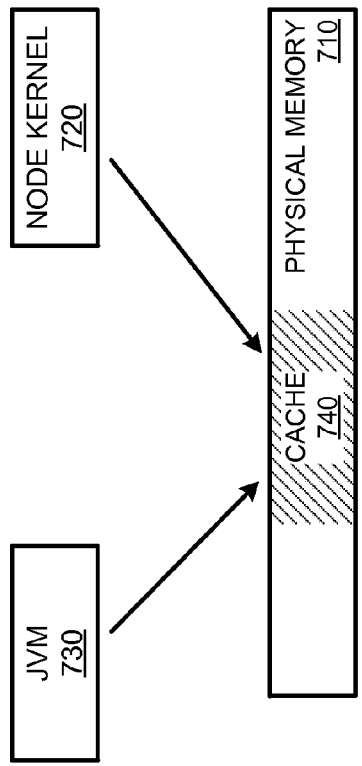
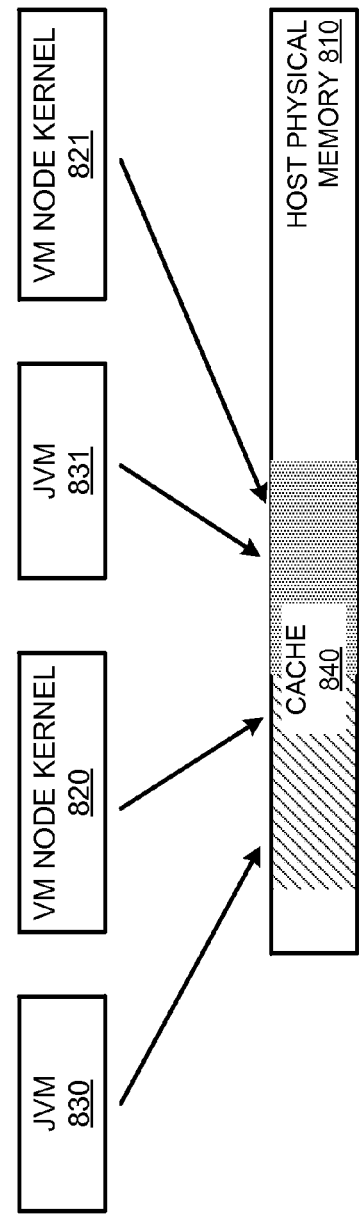

ASSOCIATING CACHE MEMORY WITH A WORK PROCESS

TECHNICAL FIELD

Aspects of the disclosure are related to computing hardware and software technology, and in particular to associating cache memory to work processes.

TECHNICAL BACKGROUND

An increasing number of data-intensive distributed applications are being developed to serve various needs, such as processing very large data sets that generally cannot be handled by a single computer. Instead, clusters of computers are employed to distribute various tasks or jobs, such as organizing and accessing the data and performing related operations with respect to the data. Various applications and frameworks have been developed to interact with such large data sets, including Hive, HBase, Hadoop, Amazon S3, and CloudStore, among others.

At the same time, virtualization techniques have gained popularity and are now commonplace in data centers and other environments in which it is useful to increase the efficiency with which computing resources are used. In a virtualized environment, one or more virtual machines are instantiated on an underlying computer (or another virtual machine) and share the resources of the underlying computer. These virtual machines may employ the applications and frameworks that typically reside on real machines to more efficiently process large data sets.

Overview

Provided herein are systems, methods, and software for associating cache memory to a work process. In one example, a method of operating a support process within a computing system for providing accelerated input and output for a work process includes monitoring for a file mapping attempt initiated by the work process. The method further includes, in response to the file mapping attempt, identifying a first region in memory already allocated to a cache service, and associating the first region in memory with the work process.

In another instance, computer apparatus to provide accelerated input and output with respect to a work process includes processing instructions that direct a support process of a computing system to monitor for a file mapping attempt initiated by the work process. The processing instructions further direct the support process to, in response to the file mapping attempt, identify a first region in memory already allocated to a cache service, and associate the first region in memory with the work process. The computer apparatus further includes one or more non-transitory computer readable media that store the processing instructions.

In a further example, a node computing system for providing accelerated input and output with respect to a work process includes the work process configured to initiate a file mapping attempt. The node computing system further provides a support process configured to identify the file mapping attempt. The support process is further configured to, in response to the file mapping attempt, identify a first region in memory already allocated to the cache service, and associate the first region in memory already allocated to the cache service with the work process.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 7 illustrates mapping Java virtual machine memory in physical memory.

FIG. 8 illustrates mapping host physical memory for multiple Java virtual machines.

TECHNICAL DISCLOSURE

Various examples described herein provide for associating cache memory to work processes. In particular, applications and frameworks have been developed to process vast amounts of data from storage repositories using one or more processing nodes or computing systems. These processing nodes may include real processing nodes, such as server computers, desktop computers, and the like, as well as virtual processing nodes that execute within real computing systems.

To process that data, data objects from a storage repository are transferred into a cluster of nodes allowing each of the processing nodes to have access to the data. Once transferred in, the framework and work processes, such Java virtual machines, process the data in parallel to generate a query response based on the data. In the present example, a cache service is included that provides shared memory between the processing nodes of the cluster and the Java virtual machines (JVMs) executing thereon. This shared cache allows data to be available directly to the JVMs without the need of loading the data into the node and copying the data into the JVM. In particular, to provide the shared memory to the JVMs, a kernel of the processing node, which may comprise a Linux kernel in many examples, monitors for a file mapping attempt initiated by a JVM. In response to the attempt, the kernel associates shared cache service memory to the JVM to allow the JVM direct access to the data objects that are delivered from the storage repository.

Although the previous example use JVMs, it should be understood that any work process, such as an application or other work process, might require the same memory association as the JVMs to access cache service memory. Further, although a kernel was used in the previous example, any similar support process that could associate cache service memory to a work process may be used. For example, a work process may initiate a request to map a file. Responsive to the request, the support process may identify a region in memory allocated to a cache service, and associate the region in memory allocated to the cache service to the work process.

Figure 1:
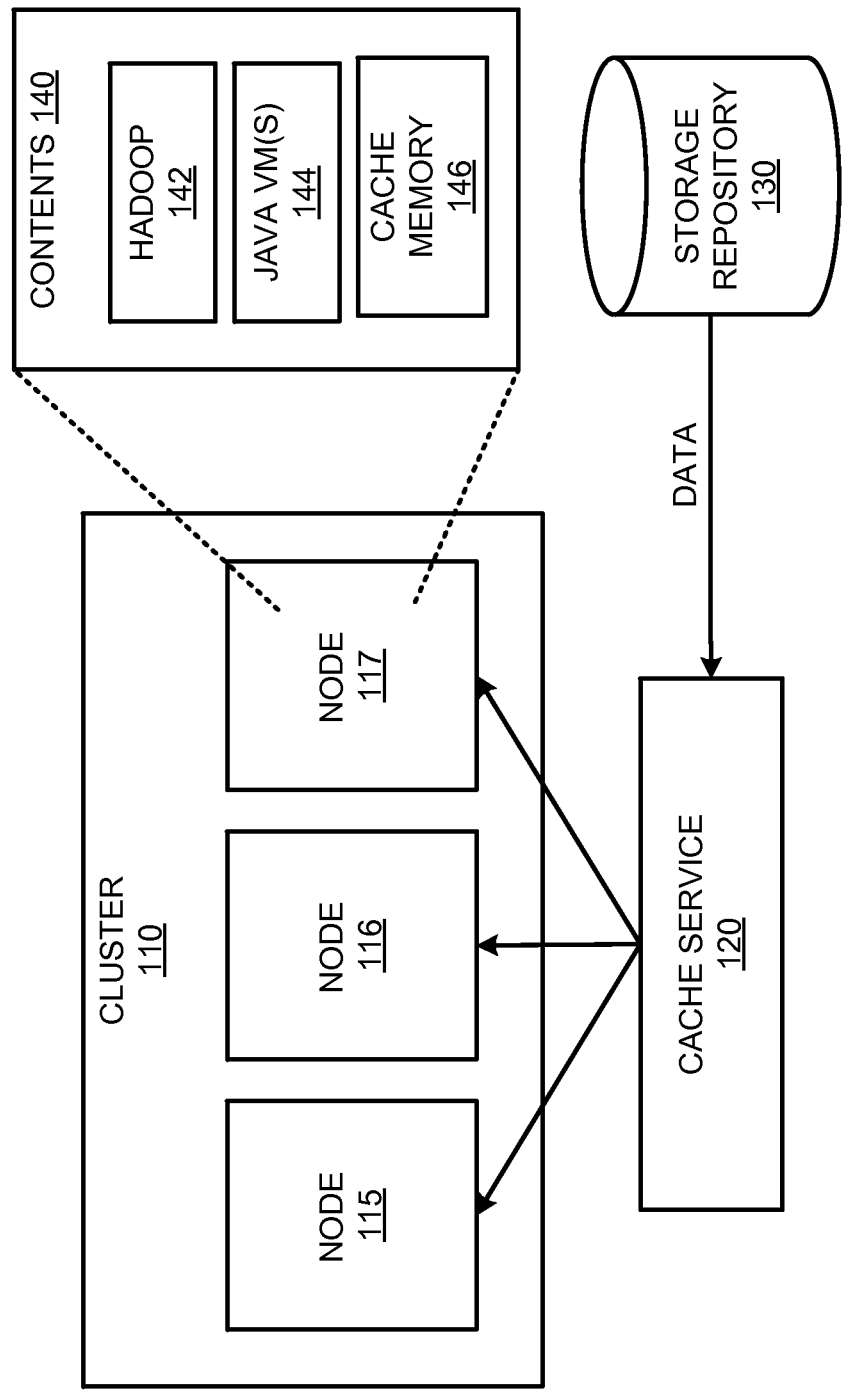
FIG. 1 illustrates map reduce system for processing data within cluster nodes.

To further illustrate the processing of data within a distributed data processing system, FIG. 1 is included. FIG. 1 illustrates map reduce system 100 for processing data within cluster nodes. System 100 includes cluster 110, cache service 120, and storage repository 130. Cluster 110 further includes nodes 115-117, and node 117 further includes contents 140 that comprise Hadoop 142, Java virtual machines (JVMs) 144, and cache memory 146.

Nodes 115-117 may comprise any real or virtual computing device capable of executing Hadoop or other similar map reduce framework. Nodes 115-117 may each include real or virtual processing systems, storage systems, communication interfaces, user interfaces, or other similar computing elements.

Cache service 120 may comprise any real or virtual computing element capable of distributing data objects to nodes 115-117. Cache service 120 may include real or virtual processing systems, storage systems, communication interfaces, user interfaces, or other similar computing elements. Although illustrated separate in the present example, it should be understood that cache service 120 might be distributed cache service, and might reside wholly or partially on the same devices as nodes 115-117.

Storage repository 130 may comprise one or more storage volumes capable of storing data to be processed by nodes 115-117. Storage repository 130 may include disk drives, solid state drives, controllers, and other elements that provide data to nodes 115-117 using cache service 120.

In operation, cluster 110 is configured with a plurality of nodes 115-117 to process large data sets that would be difficult to handle with a single computing device. Nodes 115-117 may comprise physical computing devices in some examples, but may also comprise virtual computing devices or virtual machines that execute on top of real computing devices or host systems. These virtual machines may execute using a hypervisor that abstracts the physical hardware of the host system and provides necessary elements of the host to the virtual machine. The necessary elements may include virtual hardware, such as communication interfaces, processing systems, storage elements, or any other similar virtualized item.

In the present example, node 117 includes contents 140, which comprise Hadoop framework 142, one or more JVMs 144, and cache memory 146. Although Hadoop 142 is included in the present example, it should be understood that other map reduce frameworks may be employed across cluster 110. In operation, Hadoop 142 requires one or more JVMs 144 to process portions of large data sets that are provided by cache service 120. To temporarily cache and access the data, shared cache memory 146 is included that is shared between node 117 and JVMs 144. Accordingly, as data is passed to node 117, the data is stored within cache memory 146 to give quick access to JVMs 144. Although contents are illustrated for a single node in the present example, it should be understood that the contents of nodes 115-116 might be similar to the contents of node 117.

Figure 2:
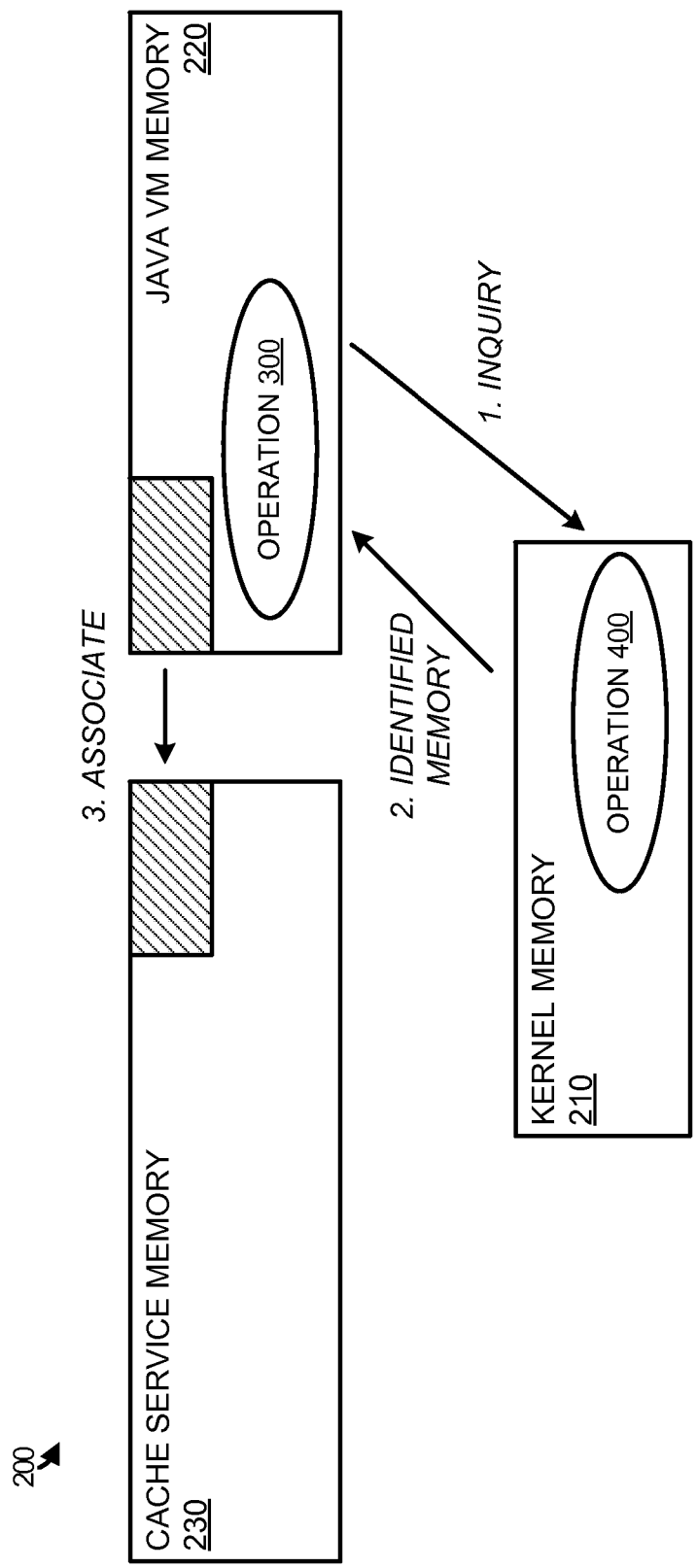
FIG. 2 illustrates an operational scenario for operating a cluster node in a map reduce cluster.

To better illustrate the caching of content for a Java virtual machine, FIG. 2 is included. FIG. 2 illustrates an operational scenario 200 for operating a cluster node in a map reduce cluster. Operational scenario 200 may be representative of the operation of any of nodes 115-117. Operational scenario 200 includes kernel memory 210, Java virtual machine (JVM) memory 220, and cache service memory 230. Kernel memory 210 is representative of the memory that is needed to operate the operating system kernel of the cluster node, such as node 117. Cache service memory 230 is representative of the shared memory that is used by the cache service to import data for processing into the cluster nodes. JVM memory 220 is representative of memory needed to execute a JVM spawned by Hadoop or other similar map reduce framework.

In operation, Hadoop or another similar map reduce framework within the cluster node may initiate a JVM to process data that is distributed to the processing node by a cache service. Once the JVM is initiated and allocated JVM memory 220, the JVM may initiate operation 300 to accelerate input/output (I/O) within the JVM. To accelerate the I/O for the JVM, the JVM will inquire the kernel to map a file to provide easier I/O transactions for the JVM. In some examples, this file mapping inquiry may comprise a new I/O channel request to map specific memory identified by the kernel to the JVM.

To respond to the inquiry, kernel memory 210 includes operation 400 that can be executed to process the inquiry from the JVM. Accordingly, in response to identifying the inquiry from the JVM, the kernel identifies at least a portion of cache service memory 230 to be used for the JVM. Once identified, the portion of cache service memory 230 is associated with the JVM. By associating a portion of cache service memory 230, the JVM is permitted quicker access to data provided by the cache service for processing.

For example, returning to FIG. 1, a portion of cache memory 146 may be associated with a JVM in JVMs 144. As a result, if cache service 120 attempts to bring data into node 117, the data may be placed in the portion of cache memory 146 that is associated with the JVM. Thus, instead of placing the data first into the node and copying the data into the JVM, the JVM may have access to the data in the memory that is shared between the node and the JVM.

Figure 3:
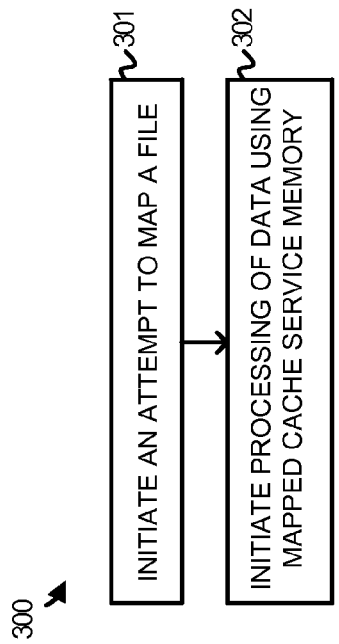
FIG. 3 illustrates a method of operating a Java virtual machine to request a mapped file.

Referring now to FIG. 3, FIG. 3 illustrates operation 300 for operating a Java virtual machine to request a mapped file. As depicted, operation 300 initiates an attempt to map a file to the JVM (301). This mapping of a file typically allows the JVM to have access to a memory space for a file that is managed by the node. However, in the present example, rather than mapping a file, the JVM is mapped to at least a portion of cache service memory 230, which caches data provided by the cache service for processing. Thus, rather than reading a file from memory, the JVM is configured to initiate processing of data that is cached in the mapped portion of cache service memory 230 (302).

Figure 4:
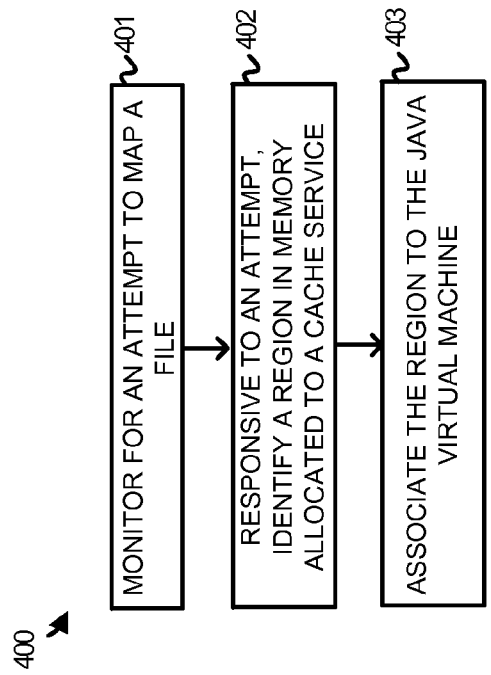
FIG. 4 illustrates a method of operating a kernel to map cache memory for a Java virtual machine.

Turning to FIG. 4, FIG. 4 illustrates operation 400 for operating a node kernel to map cache memory for a Java virtual machine. As depicted, operation 400 monitors for an attempt to map a file from one or more JVMs on the node (401). In response to an attempt, operation 400 identifies a region in memory that is allocated to the cache service (402). Once the region in memory is identified, operation 400 associates the region in memory with the Java virtual machine (403) to give the Java virtual machine access to data in the cache service memory.

Referring to FIG. 2, the JVM initiates a request to map a file, which is identified by the kernel of the processing node. Responsive to the map request, the kernel identifies at least a portion of cache service memory 230 that can be allocated for the virtual machine, and allocates the portion of cache service memory 230 to the JVM. Once the association is complete, data may be placed within the mapped cache service memory 230 to allow access to the JVM for data processing.

Figure 5:
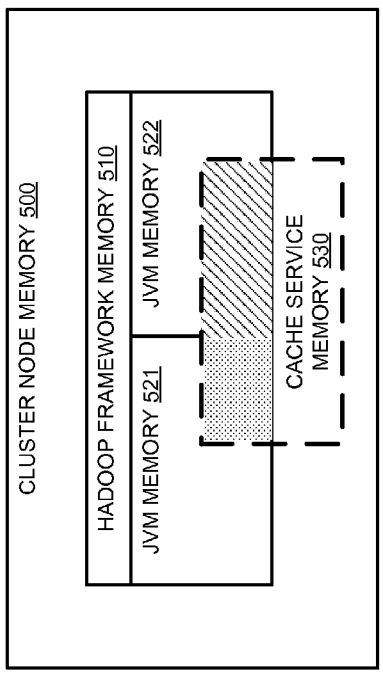
FIG. 5 illustrates cluster node memory for allocating shared memory to a cache service.

Referring to FIG. 5, FIG. 5 illustrates cluster node memory 500 for allocating shared memory to a cache service. Cluster node memory 500 includes framework memory 510, Java virtual machines (JVMs) memory 521-522, and cache service memory 530. In the present example, cluster node memory 500 is representative of memory for a physical node within a data processing cluster, however, it should be understood that nodes might be virtual machines in some examples.

In operation, a cluster node is configured with Hadoop or another similar framework to process large data sets in parallel with other nodes. This framework, represented in memory 500 by Hadoop framework memory 510, initiates JVMs to bring in and process the necessary data. In the present example, the memory for the initiated JVMs is represented in FIG. 5 by JVM memory 521-522 that includes a portion of memory that is associated with cache service memory 530. As a result of this association, JVM memory 521-522 includes at least a portion of a shared cache that temporarily stores data from various storage repositories to be processed.

For example, if a data object were to be loaded into the node for processing by a JVM, the object may be placed in the shared portion of cache service memory 530 and JVMs memory 521-522. Accordingly, once the object is cached, the appropriate JVM may load and process the object without the need of copying the data object from cluster node memory 500 to separate memory for each of the JVMs.

Figure 6:
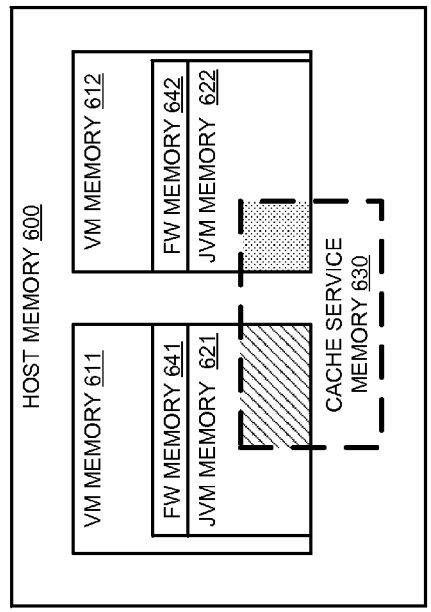
FIG. 6 illustrates host memory for allocating shared memory in a cache service.

As another illustrated example, FIG. 6 is included. FIG. 6 illustrates host memory 600 for allocating shared memory in a cache service. Host memory 600 is illustrative of a memory system in a host computing system capable of initializing and executing a variety of virtual machine nodes. These virtual machine nodes are allocated virtual machine memory 611-612 with framework memory 641-642 and Java virtual machine memory 621-622. Host memory 600 further includes cache service memory 630 to cache data for processing within the virtual machines.

In operation, a host may be configured to execute a plurality of virtual machines that act as nodes within a data processing system. These virtual machines may execute on top of a hypervisor that abstracts the physical components of the host machine and provides them to the virtual machines for execution. In the present instance, each of the virtual machines is represented in memory by virtual machine (VM) memory 611-612. Within each of the virtual machines, a framework, such as Hadoop or other map reduce framework, may be employed that is configured to process data as it is distributed to the various nodes of the cluster. Here, the framework is represented in memory has framework (FW) memory 641-642.

Once the framework is initiated within the virtual machines, the framework may be used to initiate one or more Java virtual machines or JVMs to assist in the processing of large data sets. These JVMs, represented in memory by JVM memory 621-622, access data that is provided by the framework and process the data in parallel to derive an answer to a query by an administrator or some other process. To provide data to the virtual machines, a cache service may be employed in the host that communicates with one or more storage repositories to distribute data to each of the nodes within the host.

In the present example, to quickly provide the data for each of the JVMs, each JVM is configured to inquire the virtual machine node kernel to map a file to the JVM. Responsive to this request, the kernel identifies at least a portion of cache service memory 630 that can be allocated to the JVM, and associates the portion of cache service memory 630 with the virtual machine. As a result of this association, the virtual machines are capable of being delivered data from the cache service, and placing the data directly into a portion of memory that is accessible by the JVM.

As illustrated in the present example, cache service memory 630 is configured to partially overlap with JVM memory 621-622 within VM memory 611-612. Accordingly, the overlapping portions of cache service memory 630 serve as the amount of memory that data can be cached in and directly accessible by the JVMs. Although illustrated in the present example with two virtual machines, it should be understood that any number of virtual machines might be implemented within a host. Further, although each of the virtual machines contains a single JVM, it should be understood that any number of JVMs might be spawned within each of the virtual machines.

Referring now to FIG. 7 to further demonstrate the mapping of memory to a Java virtual machine. FIG. 7 illustrates mapping Java virtual machine memory in physical memory according to one example. FIG. 7 includes physical memory 710, node kernel 720, JVM 730, and cache 740. As depicted, a node within a processing cluster includes physical memory 710 that can be used for a variety of different purposes during the execution of the node. In the present example, at least a portion of physical memory 710 is allocated to cache 740, which is used to cache data objects as they are distributed within a cluster for parallel data processing. This cache 740 is initially allocated with kernel 720, but is reserved to be accessed by the various Java virtual machines as they are initiated to process the data that is brought into the node.

Using the present example, JVM 730 may be initiated by Hadoop or another similar map reduce framework to process data within the node. Once initiated, JVM 730 may inquire node kernel 720 to map a file for JVM 730. Responsive to the inquiry, node kernel 720 may identify at least a portion of cache 740 that can be used for JVM 730, and associate the portion of cache 740 with JVM 730. As a result, JVM 730 may have quicker access to data that would otherwise need to be copied into JVM 730 before it could be accessed. In one example, a distributed cache service may be employed within a cluster to distribute data amongst each of the cluster nodes. This cache service may be configured to place the files within cache 740, which would allow JVM 730 to read the file and make the necessary processes.

Similar to the operation described above with respect to FIG. 7, FIG. 8 is included to illustrate mapping host physical memory for multiple Java virtual machines and multiple virtual nodes. FIG. 8 includes host physical memory 810, node kernels 820-821, JVMs 830-831, and cache 840. Host physical memory 810 is representative of physical memory for a host computing device such as a server or desktop computer with the ability to execute a plurality of virtual machines. In some instances, the host computing device may include a hypervisor that is configured to abstract the physical elements of the host computing device and provide them to virtual machines.

In the present example, host physical memory 810 is configured with a cache portion 840, for caching data to be processed by the various virtual machines. Accordingly, each virtual machine node kernel 820-821 is allocated a portion of the cache to allow access to data that is stored within cache 840. To process the data in each of the virtual machines, the virtual machines may be configured with Hadoop or another similar distributed framework. This framework may initiate and execute JVMs, such as JVMs 830-831, within the virtual machines to process the necessary data objects. Once initiated, JVMs 830-831 inquire VM node kernels 820-821, respectively, to map a file to the JVMs. This mapping of the file is used to allow JVMs 830-831 quick access to files that are typically only accessible by the VM itself. Responsive to the JVM request, VM node kernels 820-821 identify at least a portion of cache 840 that can be mapped to each JVM 830-831, and associates the identified portion with the JVM. As a result of this mapping, data that is placed in cache 840 for each of VM node kernels 820-821 is consequently also available to JVMs 830-831.

Figure 9:
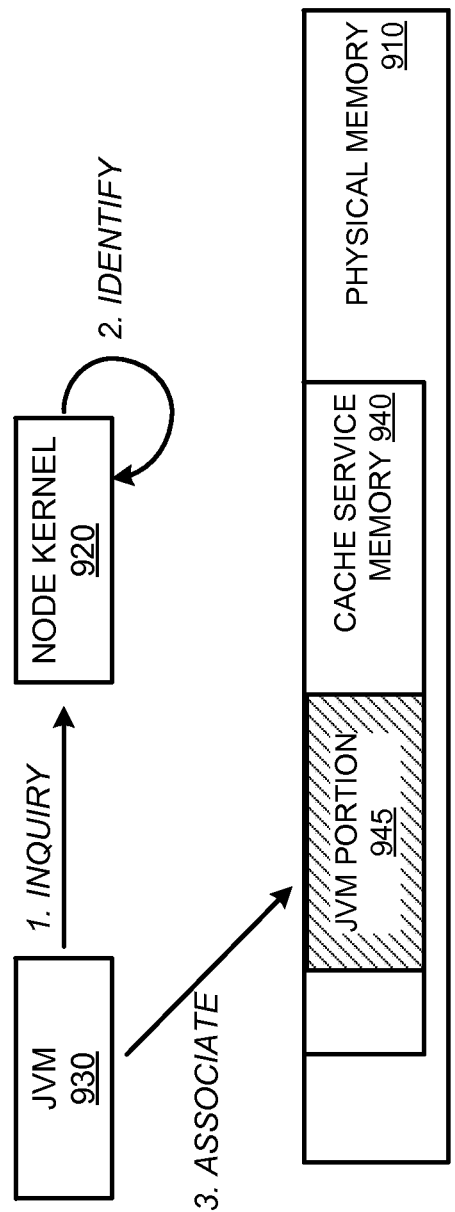
FIG. 9 illustrates an overview for providing cache service memory to a Java virtual machine.

FIG. 9 illustrates an overview 900 for providing cache service memory to a Java virtual machine. Overview 900 includes physical memory 910, node kernel 920, JVM 930, cache service memory 940, and JVM portion 945. Node kernel 920 may represent an operating system kernel in a real device, or may represent an operating system kernel for a virtual computing device or machine. In operation, a node, which may be real or virtual, is initiated to process large data sets in parallel with other nodes in a processing cluster.

When initiated, node kernel 920 monitors for file mapping requests for JVMs initiated on the node to map the JVMs to cache memory 940. Cache memory 940 is allocated memory that allows a cache service to provide data for processing by JVMs executing within the node. Once a job is allocated for the node, Hadoop or some other similar map reduce framework may initiate JVM 930 to assist in the parallel processing of the one or more data sets. Once initiated, JVM 930 inquires node kernel 920 to have a file mapped to JVM 930. Responsive to the inquiry, node kernel 920 identifies JVM portion 945 to be mapped to JVM 930. This identified portion of cache service memory 940 is then associated with JVM 930, allowing JVM 930 access to the data that is cached in JVM portion 945. By caching the data in a shared portion of memory, the data can be stored using the node, but quickly accessed by the JVM executing within the node.

Figure 10:
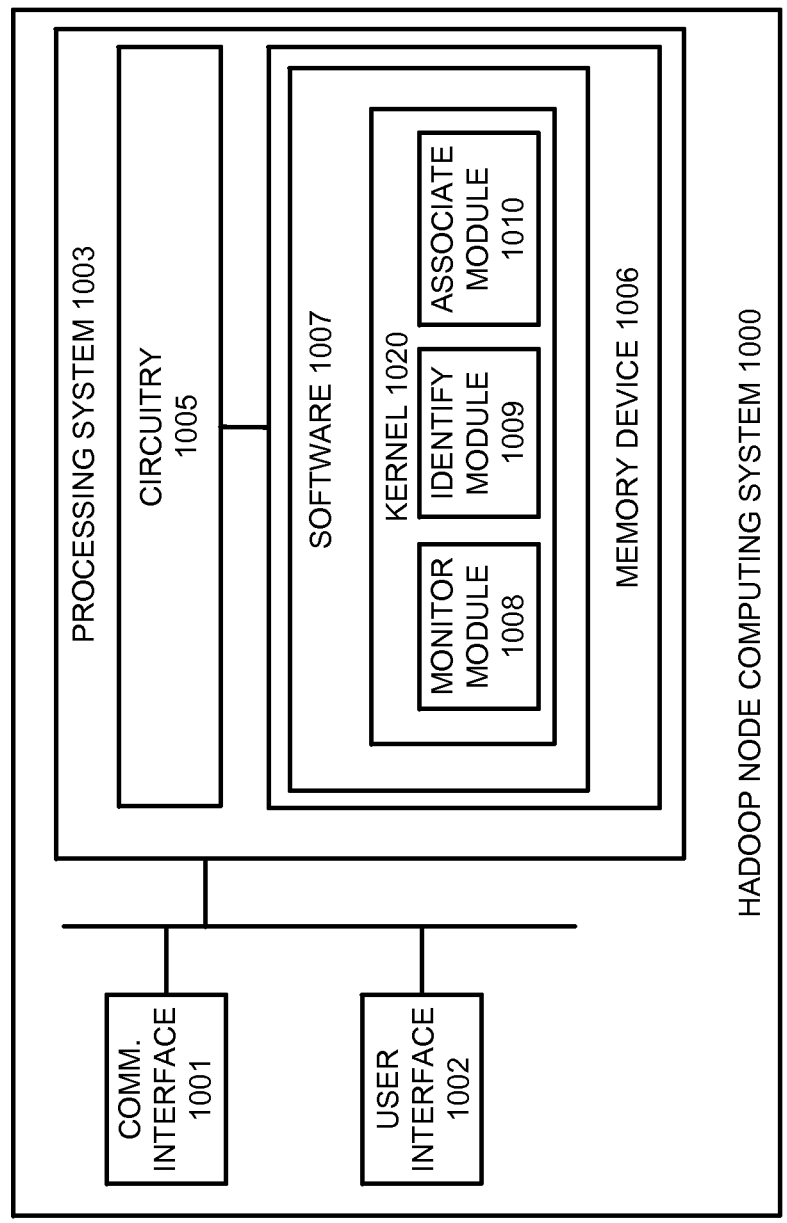
FIG. 10 illustrates a Hadoop node computing system for mapping shared memory to Java virtual machines.

Turning to FIG. 10, FIG. 10 illustrates a Hadoop node computing system 1000 for mapping shared memory to Java virtual machines. Hadoop node computing system 1000 is an example of nodes 115-117, although other examples of nodes may exist. Hadoop node computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes monitor module 1008, identify module 1009, and associate module 1010, which may be located within the kernel 1020 for Hadoop node computing system 1000. Operating software 1007 may further include an operating system, utilities, drivers, network interfaces, applications, or some other type of software. When executed by circuitry 1005, operating software 1007 directs processing system 1003 to operate Hadoop node computing system 1000 as described herein.

In particular, Hadoop node computing system 1000 is representative of a computing system for processing large data sets in a cluster environment. Hadoop node computing system 1000 may be representative of a real computing device, such as a server or desktop, but may also be representative of a virtual computing device within a host computer. In operation, computing system 1000 is configured to execute Hadoop or another similar map reduce framework. During the execution of the framework, one or more Java virtual machines JVMs may be initiated, which process the data necessary for the data analysis.

In the present example, once the JVMs are initiated, monitor module 1008 is configured to monitor for a file mapping attempt from the Java virtual machine. The file mapping attempt comprises an attempt by a JVM to map a file in memory to allow quicker access by the JVM to the file. Responsive to identifying a file mapping attempt, identify module 1009 identifies a region in memory allocated to a cache service. Prior initiating any of the JVMs, a cache service may allocate a certain amount of memory in Hadoop node computing system 1000 for caching data to be processed within the system. This memory may be allocated as a portion of kernel 1020, or any other location that is accessible by kernel 1020 and capable of being mapped to the initiated JVMs. Once the region in memory allocated to the cache service is identified, associate module 1010 associates the region in memory allocated to the cache service with the Java virtual machine. Accordingly, rather than being mapped to a file, the virtual machine is associated with memory that is allocated to the cache service. Thus, as data is delivered to computing system 1000 for processing by one or more JVMs, the JVMs may have a direct mapping to the cache service to quickly access the information without transferring the data into the JVM.

Although illustrated in the present example with three software modules, it should be understood that any number of software modules might be employed within computing system 1000 to implement operations described herein. Further, although illustrated similar to a real computing device in the present example, it should be understood that computing system 1000 might represent a virtual computing device. In such instances, computing system 1000 may be configured to operate within a host with other nodes for processing the large data sets. In some examples, the host may include a hypervisor that is used to abstract physical elements of the host machine and provide them to the processing nodes, like computing system 1000. As a result, multiple nodes may be capable of execution on a single host computing system.

Figure 11:
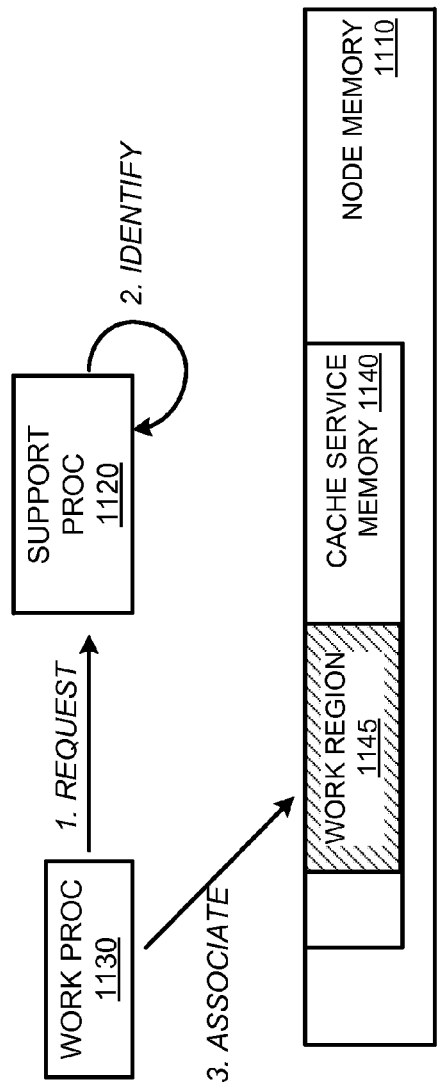
FIG. 11 illustrates an overview for providing cache service memory to a work process.

While illustrated in the previous examples using JVMs, it should be understood that any work process, such as an application or other work process, might require the same file mapping as the JVMs to access cache service memory. Further, although a kernel was used in the previous examples, any similar support process that could associate cache service memory to a work process may be used. For example, referring to FIG. 11, FIG. 11 illustrates an overview for providing cache service memory to a work process within a computing node or system. FIG. 11 includes node memory 1110, support process 1120, and work process 1130. The node memory further includes cache service memory 1140 and work region 1145 within cache service memory 1140.

In operation, work process 1130, which may be any java virtual machine or process within the computing node, may initiate a request to map a file. This mapping request is typically used to share a file in memory that would otherwise need to be copied into memory for work process 1130. Responsive to the map request, support process 1120 identifies a region in memory that is allocated to a cache service, in the present example work region 1145, and associates work region 1145 of cache service memory 1140 to work process 1130. By allocating work region 1145 of cache service memory 1140, work process 1130 may have access to data that may otherwise need to be copied into a non-shared region of memory for the work process.

Figure 12:
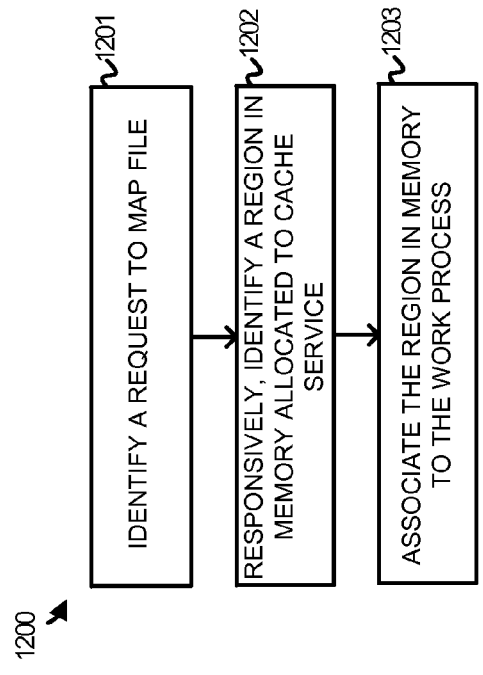
FIG. 12 illustrates a method of operating a support process in a node to associate cache memory with a work process.

To further illustrate the operation of support process 1120, FIG. 12 is included. FIG. 12 illustrates a method 1200 of operating a support process in a node to associate cache memory with a work process. The method includes identifying a request to map a file from a work process (1201). In some examples, the work process may comprise a Java virtual machine that is configured to assist a map reduce framework, but it should be understood that the work process may comprise other types of work processes. Further, the support process may be the computer node kernel or Linux kernel in some instances, but may comprise any other support process capable of allocating memory within the node. Once the support process receives the request to map a file, the support process identifies a region in memory allocated to the cache service, and associates the region in memory to the work process. Referring back to FIG. 11, support process 1120 identifies work region 1145 for work process 1130. As a result, once work region 1145 is associated with work process 1130, work process 1130 can use the cache memory to complete an assigned task.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a support process on a virtual machine for providing accelerated input and output for a work process, the method comprising:
   monitoring for a file mapping attempt initiated by the work process, wherein the work process comprises a Java virtual machine executing on the virtual machine;
   in response to the file mapping attempt, identifying a first region in memory already allocated to a cache service, wherein the memory comprises host memory accessible by the virtual machine and the cache service executing at least partially outside of the virtual machine and wherein the cache service is configured to access data for the work process and cache the data in the memory; and
   associating the first region in memory with the work process.

2. The method of claim 1 wherein the support process comprises a kernel process for the computing system.

3. The method of claim 1 further comprising identifying first data for the Java virtual machine from a storage repository, and caching, by the cache service, the first data in the first region of the memory.

4. The method of claim 3 wherein the file mapping attempt initiated by the work process comprises a new input/output channel request initiated by the Java virtual machine.

5. The method of claim 1 wherein the cache service comprises a distributed cache service for providing data to one or more work processes.

6. The method of claim 1 further comprising:
   monitoring for a second file mapping attempt initiated by a second work process;
   in response to the second file mapping attempt, identifying a second region in memory already allocated to the cache service; and
   associating the second region in memory with the second work process.

7. The method of claim 1 wherein the work process comprises a work process initiated by a Hadoop framework.

8. The method of claim 1 wherein the work process comprises a work process initiated by a map reduce framework.

9. A computer apparatus to provide accelerated input and output with respect to a work process, the computer apparatus comprising:
   processing instructions that direct a support process of a computing system, when executed by the computing system, to:
   monitor for a file mapping attempt initiated by the work process, wherein the work process comprises a Java virtual machine executing in a virtual machine;
   in response to the file mapping attempt, identify a first region in memory already allocated to a cache service, wherein the memory comprises host memory accessible by the virtual machine and the cache service executing at least partially outside of the virtual machine and wherein the cache service is configured to access data for the work process and cache the data in the memory; and associate the first region in memory with the work process; and one or more non-transitory computer readable media that store the processing instructions.

10. The computer apparatus of claim 9 wherein the support process comprises a kernel process for the computing system.

11. The computer apparatus of claim 9 wherein the processing instructions further direct the computing system to identify first data for the Java virtual machine from a storage repository and cache, by the cache service, the first data in the first region of the memory.

12. The computer apparatus of claim 11 wherein the file mapping attempt initiated by the work process comprises a new input/output channel request initiated by the Java virtual machine.

13. The computer apparatus of claim 9 wherein the processing instructions further direct the support process of the computing system to:

monitor for a second file mapping attempt initiated by a second work process;

in response to the second file mapping attempt, identify a second region in memory already allocated to the cache service; and associate the second region in memory with the second work process.

14. The computer apparatus of claim 9 wherein the work process comprises a work process initiated by a Hadoop framework.

15. The computer apparatus of claim 9 wherein the work process comprises a work process initiated by a map reduce framework.

16. The computer apparatus of claim 9 wherein the computing system comprises a real computing system.

17. A node computing system for providing accelerated input and output with respect to a work process executing on a virtual machine comprising:

the work process configured to:
initiate a file mapping attempt; and a support process executing on the virtual machine configured to:

identify the file mapping attempt;

in response to the file mapping attempt, identify a first region in memory already allocated to a cache service, wherein the memory comprises host memory accessible by the virtual machine and the cache service executing at least partially outside of the virtual machine and wherein the cache service is configured to access data for the work process and cache the data in the memory; and associate the first region in memory already allocated to the cache service with the work process.

18. The node computing system of claim 17 wherein the file mapping attempt comprises a new input/output channel request.

19. The node computing system of claim 17 wherein the work process comprises a Java virtual machine.

20. the node computing system of claim 17 wherein the support process comprises a kernel process for the virtual machine.

* * * * *